(12) United States Patent
Diascorn et al.

(10) Patent No.: US 8,724,807 B2
(45) Date of Patent: May 13, 2014

(54) METHOD FOR ETCHING AND SECURE DISTRIBUTION OF DIGITAL DATA, ACCESS DEVICE AND WRITER

(75) Inventors: Jean-Louis Diascorn, Betton (FR); Alain Durand, Rennes (FR); Sylvain Lelievre, Montgermont (FR)

(73) Assignee: Thomson Licensing, Boulogne-Billancourt (FR)

( * ) Notice: Subject to any disclaimer, the term of this patent is extended or adjusted under 35 U.S.C. 154(b) by 1181 days.

(21) Appl. No.: 12/083,279

(22) PCT Filed: Oct. 17, 2006

(86) PCT No.: PCT/FR2006/002328
§ 371 (c)(1),
(2), (4) Date: Apr. 8, 2008

(87) PCT Pub. No.: WO2007/045756
PCT Pub. Date: Apr. 26, 2007

(65) Prior Publication Data
US 2009/0070600 A1 Mar. 12, 2009

(30) Foreign Application Priority Data
Oct. 17, 2005 (FR) ...................................... 05 10566

(51) Int. Cl.
*G06F 21/00* (2013.01)
*H04K 1/00* (2006.01)

(52) U.S. Cl.
USPC ............... 380/201; 705/51; 705/911; 725/25; 725/31; 713/193; 726/26

(58) Field of Classification Search
USPC ................... 380/201, 277; 705/51, 901–912; 725/25, 31; 713/193; 726/26–27
See application file for complete search history.

(56) References Cited

U.S. PATENT DOCUMENTS

| 6,385,727 | B1 * | 5/2002 | Cassagnol et al. ............. 713/193 |
| 6,714,650 | B1 * | 3/2004 | Maillard et al. ............... 380/231 |
| 7,529,375 | B2 * | 5/2009 | Durand ......................... 380/277 |

(Continued)

FOREIGN PATENT DOCUMENTS

| FR | 2836609 | 8/2003 | |
| WO | WO 99/41874 | * 8/1999 | ............... H04L 9/00 |

OTHER PUBLICATIONS

SmartRight, Technical White Paper, pp. 1-19, Thomson, 2003.*

(Continued)

*Primary Examiner* — Fikremariam A Yalew
*Assistant Examiner* — Shanto M Abedin
(74) *Attorney, Agent, or Firm* — Tutunjian & Bitetto, P.C.

(57) ABSTRACT

The invention relates to a method of receiving and securely recording digital data comprising a step for recording said digital data on a secured disk by a recorder/receiver belonging to a determined secured domain comprising several equipment items and defined by an identifier, a step for recording on the secured disk the identifier of the domain of the recorder/receiver to define this domain as the only domain in which the reproduction/copying of the multimedia content is authorized, wherein it comprises a prior step for recovering a disk key from the secured disk, and in that the domain identifier is encrypted by said disk key and the digital data is scrambled by title keys, said title keys being encrypted by said disk key. The invention also relates to a method of securely distributing digital data, an access device and a recorder/receiver.

13 Claims, 3 Drawing Sheets

(56) References Cited

U.S. PATENT DOCUMENTS

| | | | |
|---|---|---|---|
| 2002/0157002 A1* | 10/2002 | Messerges et al. | 713/155 |
| 2003/0009668 A1* | 1/2003 | Chan et al. | 713/171 |
| 2003/0076955 A1* | 4/2003 | Alve et al. | 380/201 |
| 2003/0120942 A1* | 6/2003 | Yoshida et al. | 713/193 |
| 2003/0126445 A1* | 7/2003 | Wehrenberg | 713/176 |
| 2004/0049689 A1* | 3/2004 | Wu et al. | 713/193 |
| 2005/0075986 A1* | 4/2005 | You et al. | 705/71 |
| 2005/0084109 A1* | 4/2005 | Durand | 380/259 |
| 2005/0108560 A1* | 5/2005 | Han et al. | 713/193 |
| 2005/0169118 A1* | 8/2005 | You et al. | 369/30.05 |
| 2005/0198510 A1* | 9/2005 | Robert et al. | 713/175 |
| 2005/0210261 A1* | 9/2005 | Kamperman et al. | 713/182 |
| 2006/0021065 A1* | 1/2006 | Kamperman et al. | 726/28 |
| 2006/0190621 A1* | 8/2006 | Kamperman et al. | 709/245 |
| 2006/0212400 A1* | 9/2006 | Kamperman et al. | 705/51 |
| 2007/0198414 A1* | 8/2007 | Derrenberger | 705/51 |
| 2008/0244706 A1* | 10/2008 | Lenoir et al. | 726/4 |

OTHER PUBLICATIONS

Willem Jonker et al, Digital Rights Management in Consumer Electronics Products, pp. 82-91, IEEE Signal Processing magazine, IEEE 2004.*

Search Report Dated Apr. 25, 2007.

Andreaux et al., "Copy Protection System for Digital Home Networks", Signal Processing Magazine, IEEE, vol. 21, No. 2, Mar. 2004, pp. 100-108.

* cited by examiner

METHOD FOR ETCHING AND SECURE DISTRIBUTION OF DIGITAL DATA, ACCESS DEVICE AND WRITER

This application claims the benefit, under 35 U.S.C. 5 365 of International Application PCT/FR2006/002328, filed Oct. 17, 2006, which was published in accordance with PCT Article 21(2) on Apr. 26, 2007 in French and which claims the benefit of French patent application No. 0510566, filed on Oct. 17, 2005.

The present invention relates to a method of recording, provisioning and securely distributing digital data representative of a multimedia content.

To avoid the illegal copying of multimedia content, document JP 2001/195826 discloses an appliance comprising a memory storing an identifier specific to each appliance and different from the identifiers of the other appliances. The appliance is adapted to store digital data and its own identifier on a storage medium on each recording. Before reading the digital data, it is suitable for comparing its identifier with the identifier read on the storage medium and for presenting the digital data only when the identifier stored on the storage medium corresponds to its identifier.

This appliance observes the property rights but allows the digital data to be presented only on a unique appliance.

To enable a wider distribution of the digital data while observing the property rights attached to the latter, it is known to secure digital data recorded on a secured DVD by data protection methods such as the content scrambling system (CSS) method.

However, with this method, the digital data recorded on the secured DVD can be read by any authorized drive, but cannot be copied or reproduced.

Moreover, data protection methods in a domain are known, such as the method with the registered trade mark "SmartRight" described in the document "SmartRight Technical white paper, Version 1.7, January 2003, Thomson" and the method with the registered trade mark "eXtensible Content Protection" described in the documents "xCP: eXtensible Content Protection. 2003. IBM" and "xCP Cluster Protocol, IBM Presentation to Copy Protection Technical Working Group, Jul. 18, 2002". These methods enable the digital data to be scrambled according to an encryption protocol that can be decoded only by the equipment belonging to the same domain. The duly encrypted digital data can be presented or copied/reproduced only by the equipment belonging to a domain.

However, this digital data cannot be shared with a person who does not have access to this domain. It is therefore not possible to share this digital data with a friend or an acquaintance.

Also known, notably from the US document 2004/0230532, is a digital data copy management system enabling one or more reproductions/copies of the latter by one and the same recorder but prohibiting copying by another recorder.

This system comprises a server that can be accessed via the Internet network and particular recorders/drives intended for the users. On each recording, each recorder/drive is adapted to transmit to the server an identifier that is specific to it, an identifier of the DVD and an identifier of the content read on the DVD. This server contains a database, means of registering identifiers received by the recorder and means of comparing the identifiers stored in its database and the identifiers received by the recorder to check whether the identifiers sent by a recorder correspond to the identifiers already stored in the database.

However, this system is complex and requires the management of a database containing a large quantity of data.

The aim of the invention is to propose a method of securely distributing digital data enabling a certain degree of sharing of the digital data while observing the property rights attached to the latter.

To this end, the subject of the invention is a method of receiving and securely recording digital data representative of a multimedia content comprising a step for recording said digital data on a secured disk by a recorder/receiver belonging to a determined secured domain comprising several equipment items and defined by an identifier specific to all the equipment of the domain, a step for recording on the secured disk the domain identifier of the recorder/receiver to define this domain as the only domain in which the reproduction/copying of the multimedia content is authorized, characterized in that it also comprises a prior step for recovering a disk key from the secured disk, and in that the domain identifier is encrypted by said disk key and the recorded digital data is scrambled by title keys, said title keys being encrypted by said disk key.

According to particular embodiments, the reception and recording method also comprises a step for recording on the secured disk reproduction rights attached to the multimedia content, the reproduction rights defining whether the multimedia content is freely reproducible/copyable, whether the multimedia content is reproducible/copyable in the determined domain only or whether the multimedia content is not reproducible/copyable.

The invention also, according to a second aspect, relates to a method of securely distributing digital data representative of a multimedia content comprising the following steps:
  reception and recording of digital data representative of a multimedia content on a secured disk from a recorder/receiver, the recording step being performed by the reception and recording method mentioned hereinabove; and
  secured provisioning of said recorded digital data, in a specific secured domain defined by an identifier, from a device for accessing the specific secured domain comprising means of storing the identifier of this specific domain, the provisioning step comprising the following steps:
  reading, on the secured disk, of the identifier of the determined secured domain by the access device;
  comparing the identifier read on the secured disk with the identifier stored in the storage means of the access device;
  when the identifier read on the secured disk does not correspond to the identifier stored in the storage means of the access device, provisioning by the access device of the digital data so as to authorize a first mode of operation of the digital data; and
  when the identifier read on the secured disk corresponds to the identifier stored in the storage means of the access device, provisioning by the access device of the digital data so as to authorize a second mode of operation of the digital data.

According to particular embodiments, the distribution method comprises one or more of the following characteristics:
  when the digital data is provisioned so as to authorize a first mode of operation of the digital data, the provisioning step comprises a step for scrambling of the digital data by the access device according to a suitable protocol to prohibit the reproduction/copying of the multimedia content and to authorize the presentation of the multimedia content on a presentation device belonging to the specific domain only while the digital data is being read by the access device;

when the digital data is provisioned so as to authorize a second operating mode, the provisioning step also comprises the following steps:
  reading by the access device of reproduction rights prerecorded on the secured disk;
  reading on the secured disk of reproduction rights attached to the multimedia content, the reproduction rights defining whether the multimedia content is freely reproducible/copyable, whether the multimedia content is reproducible/copyable in the determined domain only or whether the multimedia content is not reproducible/copyable; and
  scrambling of the digital data by the access device according to a protocol defined according to the reproduction rights read on the secured disk; and when the reproduction rights read authorize the reproduction/copying of the multimedia content in the determined domain only, the provisioning step comprises a step for scrambling of the digital data by the access device according to a suitable protocol to authorize the reproduction/copying and the presentation of the multimedia content only on equipment belonging to the determined domain;

when the reproduction rights prohibit the reproduction/copying of the multimedia content, the provisioning step comprises a step for scrambling of the digital data by the access device according to a suitable protocol to prohibit the reproduction/copying of the multimedia content, and authorize only the presentation of the multimedia content on a presentation device belonging to the determined domain while the digital data is being read by the access device;

when the reproduction rights authorize the free reproduction/copying of the multimedia content, the provisioning step comprises a step for scrambling of the digital data by the access device according to a suitable protocol to authorize the reproduction/copying and the presentation of the multimedia content on any equipment;

it also comprises a step for transmission of the reproduction rights attached to the multimedia content from a remote server to said recorder/receiver, the transmission step being prior to the step for recording of the reproduction rights; and it comprises a step for encryption of the identifier and of the reproduction rights, said encryption step being prior to the recording step.

The invention also, according to a third aspect, relates to a device for accessing a specific secured domain, the access device comprising:
  means of reading digital data representative of a multimedia content recorded on a secured disk, the reading means being suitable for reading on the secured disk an identifier of a determined secured domain;
  means of storing an identifier of the specific domain to which the access device belongs;
  means of comparing the identifier stored in the storage means with the identifier read on the secured disk and decrypting the domain identifier using the disk key; and
  means suitable for providing digital data so as to authorize a first mode of operation of the digital data, when the identifier read on the secured disk does not correspond to the identifier stored in the storage means of the access device, and to provide digital data so as to authorize a second mode of operation of the digital data when the identifier read on the secured disk corresponds to the identifier stored in the storage means of the access device, characterized in that the access device also comprises:
  encryption/decryption means suitable for recovering a disk key from the secured disk and decrypting the domain identifier using the disk key; and
  scrambling/descrambling means able to descramble the digital data recorded on the secured disk using said disk key.

The invention also, according to a fourth aspect, relates to a recorder/receiver belonging to a secured domain comprising several equipment items and defined by an identifier specific to all the equipment of said domain, the recorder/receiver being suitable for recording on a secured disk digital data representative of a multimedia content, the recorder/receiver being suitable for recording on the secured disk the domain identifier of the recorder/receiver to define this domain as the only domain in which the reproduction/copying of the multimedia content is authorized, characterized in that the recorder/receiver is suitable for recovering a disk key from the secured disk, for scrambling the digital data by title keys, the title keys being encrypted by said disk key, for encrypting the identifier using the disk key and for recording said scrambled digital data and said encrypted identifier.

According to particular embodiments, the recorder/receiver comprises one or more of the following characteristics:
  it is suitable for recording reproduction rights attached to a multimedia content, the reproduction rights defining whether the multimedia content is freely reproducible/copyable or whether the multimedia content is reproducible/copyable in a determined domain only, or whether the multimedia content is not reproducible/copyable; and
  the reproduction rights attached to a multimedia content comprise the number of reproductions allowed of the multimedia content.

The invention will be better understood from reading the description that follows, given purely as an example and with reference to the drawings, in which.

Figure 1:
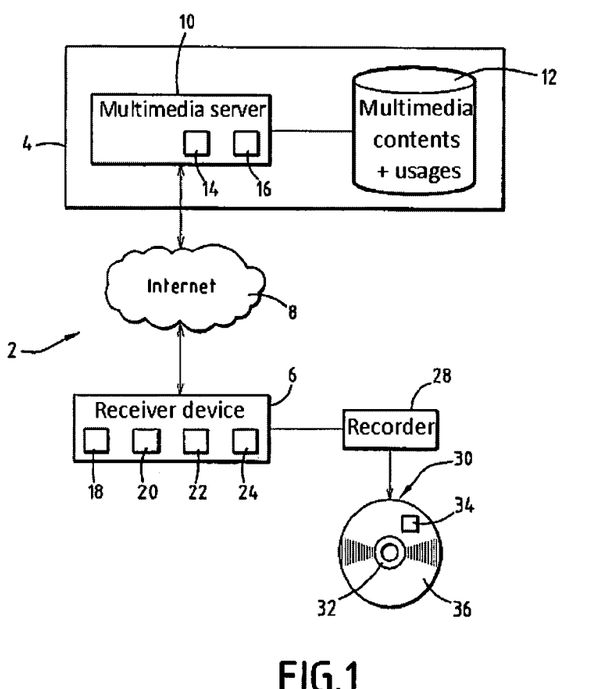
FIG. 1 is a functional block diagram of a part of the system making it possible to implement the distribution method according to the invention.
Figure 2:
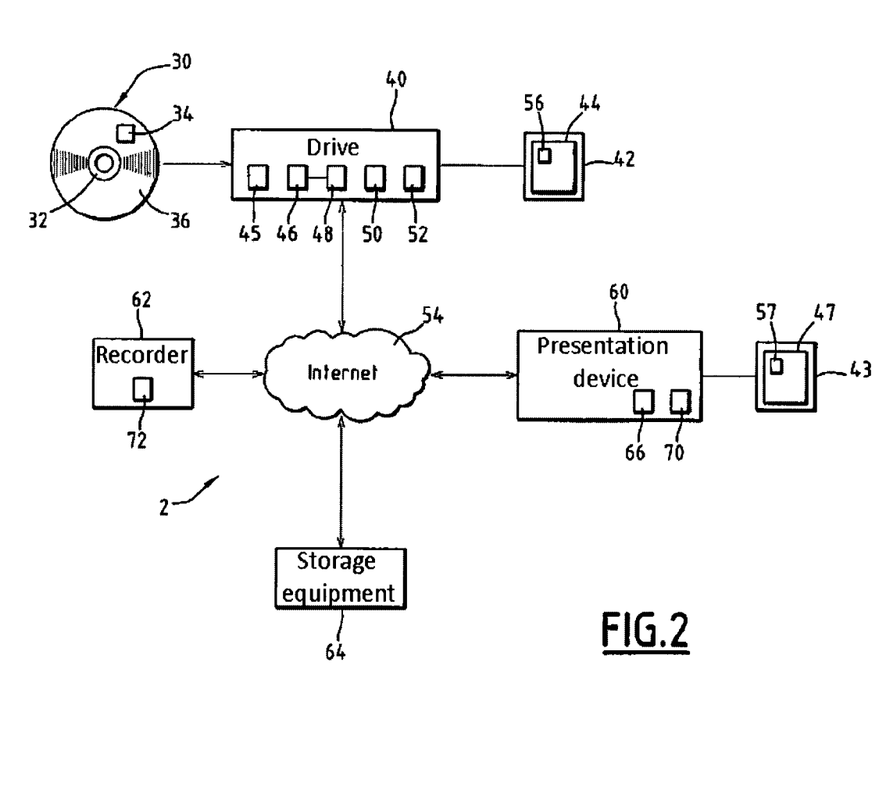
FIG. 2 is a functional block diagram of another part of the system making it possible to implement the distribution method according to the invention.

The system 2 in which the method according to the invention is implemented is illustrated in FIGS. 1 and 2. This system 2 relates to a set of IT equipment items having either a DVD recorder or a DVD drive and belonging to different users and likely to swap DVDs. The equipment items are distributed between different secured domains.

The equipment items belonging to one secure domain each have in a memory one and the same identifier representative of this domain and a domain key. The equipment in this domain can communicate, via a network, digital data scrambled by this domain key. Equipment not belonging to this secured domain or belonging to another secured domain cannot read the scrambled data crossing this network or the scrambled data secured on equipment in the network.

As can be seen in FIG. 1, the system 2 comprises a content provider 4 suitable for providing a receiver device 6 with digital data via a distribution network 8, such as the Internet network.

The content provider 4 comprises a multimedia server 10 linked to a database 12.

The database 12 is suitable for storing digital data representative of multimedia content, such as, for example, audio, video or textual data sequences or computer data files used to set up software.

The digital data is encoded in packet form, for example according to the MPEG-2 standard (ISO/IEC 13818-1).

In the database 12, each multimedia content is associated with one or more usages or reproduction rights and with a price varying according to these usages or rights.

The usages identify the type of protection attached to the copying or the reproduction of the multimedia content. In the example of the embodiment described, the usages define whether the multimedia content is freely copyable/reproducible, whether it can be copied to a secured DVD or whether it is both copyable to a secured DVD and copyable/reproducible in a single domain corresponding to the domain to which the recorder having recorded the content on the secured DVD belongs.

The multimedia server 10 comprises means 14 for sending or for receiving digital data to the distribution network 8 or from this network, and a module 16 for scrambling this digital data.

The scrambling module 16 is suitable for scrambling the data according to the CSS system.

The receiver device 6 is a computer or a set-top box. It is normally installed in the home of a user who wants to access video programs via the distribution network 8.

The receiver device 6 belongs to a domain secured by a protection system such as, for example, the system with the registered trade mark SmartRight.

The equipment items belonging to this secured domain each have in a memory one and the same identifier IDD representative of this domain and a domain key DIK.

The receiver device 6 has a processor 18, an encryption/decryption module 20, a user interface 22 of keyboard, screen or remote control type and a network interface 24 for sending or receiving data.

The processor 18 is suitable for executing the protocols of the SmartRight data protection system and the protocols of the CSS protection system corresponding to the protection system used by the scrambling module 16. To this end, it in particular comprises a master key MK and an identifier IDD of the domain to which the receiver device 6 belongs.

The interface 24 is suitable for receiving data streams from the distribution network 8 by real time downloading (or streaming), that is, by viewing the content as it loads, or by prior downloading enabling the content to be viewed off-line.

The receiver device 6 is linked to a recorder 28 of DVDs 30 for example of DVD-R, DVD-RW, DVD+R, DVD+RW or DVD-RAM type.

The DVD 30 comprises a start area 32 prerecorded with a set of disk keys secured according to the protocol of the CSS protection system, a storage area 34 and a digital data recording area 36.

The storage area 34 is a particular area of the DVD which can be recorded by any recorder. For a DVD-R type DVD, the storage area 34 comprises, for example, a field called RMD field 2. This field is defined in the document "DVD Specifications for Recordable Disk for General, Part 1, Physical Specifications, Version 2.0, May 2000".

As can be seen in FIG. 2, the system 2 according to the invention also comprises a DVD drive 40 forming a device for accessing a domain secured by the SmartRight protection system. The drive 40 is linked to a chip card reader 42 designed to receive a chip card 44.

The drive 40 comprises means 45 of reading DVDs and means 46 of storing a master key MK', connected to an encryption/decryption module 48.

The drive 40 also comprises a scrambling/descrambling module 50 and a network interface 52 for sending and receiving digital data via a distribution network 54 such as, for example, a domestic network, an Intranet network or an Internet network.

The chip card 44 contains a secured processor 56. This processor 56 is suitable for securely storing an identifier IDL specific to the domain to which the drive 40 belongs and an encryption key DOK of this domain.

The processor 56 is suitable for comparing data, receiving and transferring data from and to the drive 40, generating random numbers and encoding them according to the SmartRight protection protocol.

The system 2 also comprises a television type presentation device 60, a recorder 62 and storage equipment 64.

The presentation device 60 and the recorder 62 each comprise a network interface 70, 72 for receiving digital data from the drive 40 or searching for the digital data on the storage equipment 64. They belong to the same secured domain as the drive 40.

The presentation device 60 comprises a descrambling module 66. It is connected to a chip card reader 43 receiving a chip card 47 storing the identifier IDL and the encryption key DOK of this domain in a secured processor 57.

The storage equipment 64 can be accessed by any equipment connected to the distribution network 54 and notably by equipment not belonging to the domain defined by the identifier IDL.

Figure 3:
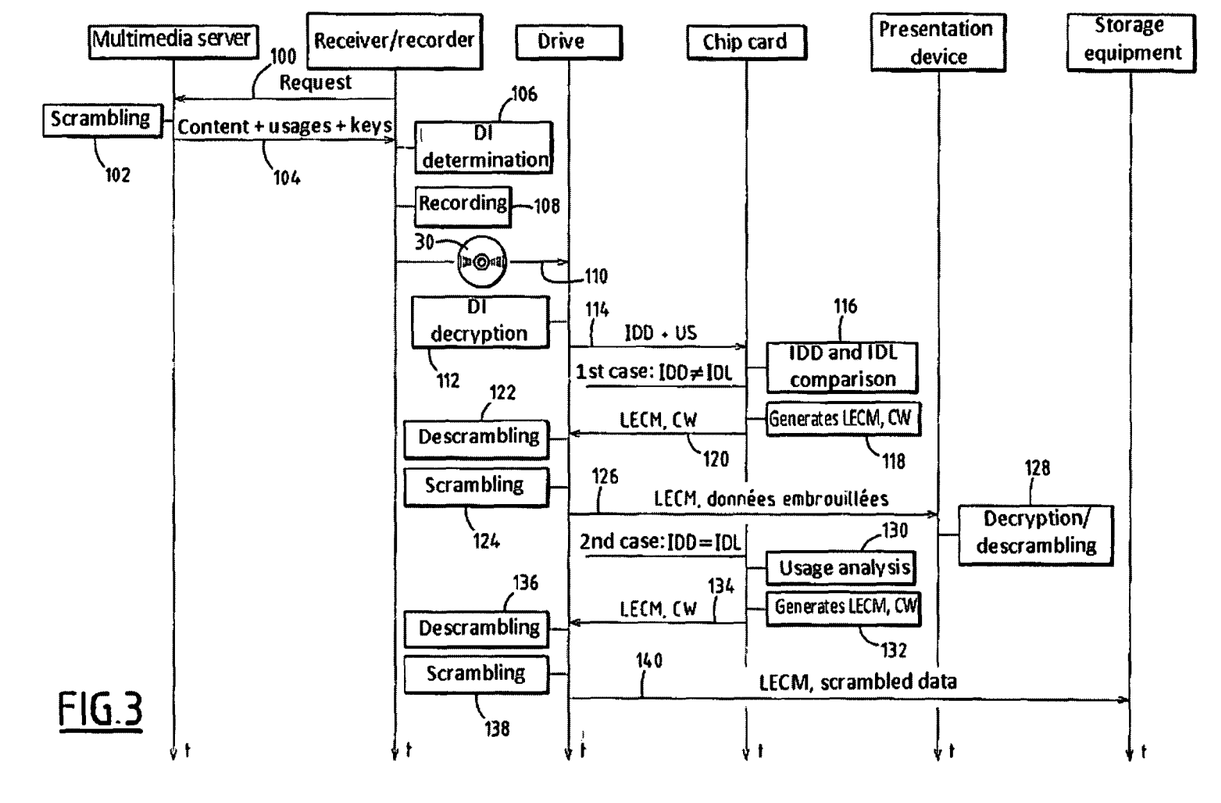
FIG. 3 is a diagram illustrating the steps of the distribution method according to the invention.

In FIG. 3, the vertical axes represent the time axis and the horizontal lines illustrate the exchanges between the equipment items of the system represented in FIGS. 1 and 2.

In a first step 100, a user uses the user interface 22 of the receiver device to select a video sequence, for example a film or a particular transmission that he wants to record on a DVD 30.

The recorder 28 reads all the secured disk keys recorded on the start area 32 of the DVD and transmits this set of secured disk keys to the receiver device 6.

The encryption/decryption module 20 of the receiver device 6 recovers the disk key DK from this set of secured keys and the master key MK.

The receiver device 6 then constructs a video content request message that it sends to the address of the multimedia server 10. This request contains an identifier of the ordered video sequence, an identifier of the receiver device 6, the disk key DK which has just been obtained, an indication of the requested usages and a payment instruction.

In the next step 102, the multimedia server 10 searches for the requested video content in the database 12, scrambles it using title keys and encrypts the title keys using the disk key DK received according to the CSS protocol.

In the step 104, the multimedia server 10 transmits to the receiver device 6 the video content scrambled by the title keys, the title keys encrypted by the disk key DK and an indication of the usages bought by the user.

During a step 106, the encryption/decryption module 20 of the receiver device determines and encrypts domain information DI. This domain information DI comprises the usages bought by the user and the identifier IDD of the domain to which the receiver device belongs.

For example, the domain information DI takes the following form:

$$DI = AES[DDK](IDD\|US)$$

in which AES is an encryption standard (Advanced Encryption Standard);

"||" is a concatenation operator;

DDK is a key adapted to the AES encryption standard, derived from the disk key DK, for example by concatenating "0" bits with the low order bits of the key DK to obtain a key of the size required by AES;

IDD is the identifier of the domain of the receiver device;

US is a transcription in the SmartRight format of the usages attached to the video content.

In the step 108, the recorder 28 records the scrambled video content on the data recording area 36 and the domain information DI on the storage area 34.

Thus, the user has a DVD 30 comprising a video content protected according to the CSS specification and an identifier IDD characterizing the particular domain in which the multimedia content has been recorded and to which the DVD is attached.

During a step 110, the user wants to make the downloaded video content available to the equipment in the domain defined by the identifier IDL.

To this end, the DVD 30 is inserted into the drive 40 belonging to this domain. The reading means 45 of the drive read all the secured disk keys in the start area 32 of the DVD and the domain information DI stored in the storage area 34 of the DVD.

During a step 112, the encryption/decryption module 48 recovers the disk key DK from the set of secured disk keys and the master key MK' which is contained in the drive 40 (according to the principle of the CSS specification). It deduces from this disk key DK a derived key DDK and uses this key DDK to decrypt, the domain information DI to recover the usages US and the identifier IDD of the domain in which the DVD 30 was recorded.

During a step 114, the drive 40 transmits the usages US and the identifier IDD to the chip card 44.

During a step 116, the processor 56 of the chip card checks whether the identifier IDD recorded on the DVD corresponds to the identifier IDL that it stores.

If the identifier IDD recorded on the DVD 30 does not correspond to the identifier IDL of the chip card, the DVD 30 was not recorded by a recorder belonging to the same domain as the drive 40.

In this case, during a step 118, the processor 56 of the chip card generates control words, generally denoted CW, and control messages, denoted LECM (local entitlement control messages). The control messages LECM include the control words CW encrypted so as to be decryptable only using the domain key DOK, the identifier IDL of the domain of the drive 40, an integrity check and the usages US protected by an integrity computation. These control messages LECM can be decrypted only by the equipment belonging to the same domain as the drive 40.

When the identifier IDD is different from the identifier IDL, the control words CW contained in the control messages LECM are superencrypted.

According to the SmartRight domain protection protocol, control messages LECM comprising superencrypted control words CW indicate to any equipment receiving these control messages LECM and digital data attached to the latter that the digital data received can be presented only while reading the DVD and cannot be copied or reproduced.

During a step 120, the processor 56 of the chip card transmits the control messages LECM and the control words CW that have been generated to the drive 40.

During a step 122, the scrambling/descrambling module 50 of the drive descrambles the digital data recorded on the area 36 of the DVD using the key DK obtained in the step 112.

During a step 124, the scrambling/descrambling module 50 of the drive scrambles the digital data descrambled during the step 122, using control words CW generated by the processor 56 of the chip card.

During a step 126, the drive 40 transmits to the presentation device 60, via the distribution network 54, the digital data scrambled using control words CW and the control messages LECM generated by the processor 56.

During a step 128, the processor 57 of the chip card connected to the presentation device 60 decrypts the control messages LECM and the descrambling module 66 descrambles the digital data received so that the device displays the video transmitted through the network 54.

Thus, the presentation device 60 displays the video content simultaneously with the reading of the DVD 30 by the drive 40.

The recorder 62 also has access to this digital data transmitted via the distribution network 54. However, the recorder 62 can, for the convenience of the user, prevent the reproduction or the copying of this data to a DVD, because if such a copy is made, this copy will be unusable because the control words CW are superencrypted.

This digital data presentation mode is known to the SmartRight protocol by the protocol name "view only" and is notably described in the document "SmartRight Technical white paper, Version 1.7, January 2003, Thomson".

When the identifier IDD is equal to the identifier IDL, the processor 56 of the chip card analyses the usages US bought when recording the DVD during a step 130.

When these usages allow for the video content to be reproduced or copied in one domain only, the processor 56 generates, during a step 132, control words CW and control messages LECM containing these control words CW encrypted by the domain key DOK in such a way that these control messages LECM can be decrypted only by the equipment belonging to the same domain as the drive 40, that is, to the domain of identifier IDL=IDD and comprising the domain key DOK.

During a step 134, the control messages LECM and the control words CW are transmitted to the drive 40.

During a step 136, the digital data read on the DVD is descrambled according to the same method as the method described during the step 122.

During a step 138, this digital data descrambled during the step 136 is scrambled by the control words CW generated during the step 132.

During a step 140, the scrambled digital data and the control messages LECM are transmitted to the storage equipment 64 via the distribution network 54 to be recorded therein.

Only the equipment belonging to the same domain as the drive 40 can decrypt the control messages LECM and reproduce/copy or present the digital data stored on the equipment 64.

If, during the step 130, the usages analysed define that the digital data is freely copyable/reproducible, the processor 56 of the chip card generates control messages LECM containing unencrypted control words.

Then, the steps 134 to 140 are repeated. However in this case, any equipment and even the equipment not belonging to the domain of identifier IDD=IDL can read, present or copy the digital data, because the latter is not scrambled by secured cryptographic keys.

If, during the step 130, the processor 56 determines that the digital data is not reproducible/copyable, then it generates control messages LECM and control words CW that are superencrypted and the steps 120 to 128 are repeated. In this case, the digital data will still be presentable by a presentation device belonging to the domain identified by the identifier IDL.

The method according to the invention can also be implemented in a domain protection system protected according to the method of registered trademark xCP (Extensible Content Protection) described in the documents "xCP: extensible Content Protection. 2003. IBM" and "xCP Cluster Protocol, IBM Presentation to Copy Protection Technical Working Group, Jul. 18, 2002".

According to this domain protection method, each domain or equipment group is defined by a group identifier ID called "cluster ID".

The recorder comprises means of storing the group identifier ID and is adapted to calculate the domain information DI. This information DI is obtained by applying a hashing function to the concatenated data comprising the disk key DK of the DVD, the group identifier ID and a copy indicator being able to take the value 0 or 1 depending on whether this copy is authorized or not.

The recorder is adapted to record the domain information DI on the DVD.

The receiver device receiving the recorded DVD determines whether the DVD has been recorded in its domain by constructing its own domain information DI'. To this end, it re-uses the identifier of its own domain, it sets the copy indicator to a value corresponding to an authorized copy and reuses the disk key DK read on the DVD.

If the domain information DI of the DVD and the domain information DI' of the receiver device constructed in this way correspond, then the copy is authorized and the receiver device descrambles then scrambles the digital data according to the xCP protocol of this domain.

If the domain information DI of the DVD and the domain information DI' of the receiver device constructed in this way does not correspond, the copy operation is prohibited.

As a variant, this secured distribution method can be used with a DVD secured according to the CPPM (Content Protection for Prerecorded Media) system, the CPRM (Content Protection for Recordable Media) system, the BD CPS system for blue ray disk (Blue ray disk copy protection system) or the Vidi system for DVD+R/DVD+RW disks.

As a variant, the recorder records on the DVD only the digital data and the domain identifier but not the usages or reproduction rights attached to the digital data. In this case, when the drive reads an identifier, the chip card generates control words and control messages according to a protocol allowing only copying/reproduction in the domain identified on the disk. When the DVD does not include an identifier, the chip card generates control words and control messages that are superencrypted according to a protocol preventing the copying/reproduction by any equipment. In this case, the digital data is still presentable by a presentation device belonging to the domain.

As a variant, the DVD is marketed prerecorded in a form in which it contains digital data representative of a multimedia content and associated usages. Before the first use of this DVD and for the DVD to be able to be read by an equipment item, this DVD must be placed in a recorder suitable for recording the identifier of the domain to which the recorder belongs. In this case, the DVD or the drive is conditioned to operate only when the DVD contains a domain identifier.

Advantageously, this secured distribution method allows a certain freedom in sharing digital data with friends or acquaintances and a sharing with the equipment linked to the same domain while protecting the intellectual property rights attached to this digital data.

Advantageously, the secured disks on which a copy/reproduction of the multimedia content has been recorded, can only be read and presented in the domain defined by the identifier recorded on the secured disk on which the downloaded version of the multimedia content and the domain identifier have been recorded. However, the latter secured disk, that is, the disk containing the downloaded version of the multimedia content and the domain identifier, can be read and presented on any CSS presentation device authorized in any domain.

The invention claimed is:

1. Method of receiving and securely recording digital data representative of a multimedia content on a secured disk, the method comprising the steps of:
   recovering a disk key from the secured disk according to a data protection system for recordable media, wherein the disk is secured by said data protection system for recordable media;
   recording comprising the following steps:
   recording said digital data on the secured disk by a recorder/receiver belonging to a determined secured domain having several equipment items and defined by a first domain identifier according to a data protection system in a domain, said first domain identifier being specific to all the equipment of the determined secured domain;
   recording the first domain identifier of the recorder/receiver on the secured disk by said recorder/receiver belonging to said secure domain so as to define said determined secured domain as the only domain in which the reproduction/copying of the multimedia content is authorized;
   secured provisioning of said recorded digital data, in a specific secured domain defined by a second domain identifier according to the data protection system in a domain, from an access device for accessing the specific secured domain having means of storing the second domain identifier of said specific secured domain,
   the secured provisioning further comprising:
   reading, on the secured disk, of the first domain identifier of the determined secured domain by the access device;
   comparing of the first domain identifier read on the secured disk with the second domain identifier stored in the storage means of the access device;
   when the first domain identifier read on the secured disk does not correspond to the second domain identifier stored in the storage means of the access device, provisioning the digital data by the access device to authorize a first mode of operation of the digital data; and
   when the first domain identifier read on the secured disk corresponds to the second domain identifier stored in the storage means of the access device provisioning the digital data by the access device to authorize a second mode of operation of the digital data;
   wherein the first domain identifier is encrypted by said disk key and the recorded digital data is scrambled by title keys, said title keys being encrypted by said disk key.

2. Method of receiving and securely recording according to claim 1, wherein said recording further comprises another step of recording reproduction rights attached to the multimedia content on the secured disk, the reproduction rights defining whether the multimedia content is freely reproducible/copyable, whether the multimedia content is reproducible/copyable in the determined secured domain only or whether the multimedia content is not reproducible/copyable.

3. Secured distribution method according to claim 1, wherein when the digital data is provisioned so as to authorize the first mode of operation of the digital data, the secured provisioning further comprises scrambling of the digital data by the access device according to a suitable protocol to prohibit the reproduction/copying of the multimedia content and to authorize the presentation of the multimedia content on a presentation device belonging to the specific secured domain only while the digital data is being read by the access device.

4. Secured distribution method according to claim 1, wherein when the digital data is provisioned so as to authorize the second operating mode, the secured provisioning further comprises:
   reading on the secured disk of reproduction rights attached to the multimedia content, the reproduction rights defining the following:
   whether the multimedia content is freely reproducible/copyable,
   whether the multimedia content is reproducible/copyable in the determined secured domain only, or
   whether the multimedia content is not reproducible/copyable; and
   scrambling of the digital data by the access device according to a protocol defined according to the reproduction rights read on the secured disk.

5. Secured distribution method according to claim 4, wherein when the reproduction rights read authorize the reproduction/copying of the multimedia content in the determined secured domain only, the scrambling of the digital data by the access device comprises a suitable protocol to authorize the reproduction/copying and the presentation of the multimedia content only on equipment belonging to the determined secured domain.

6. Secured distribution method according to claim 4, wherein when the reproduction rights prohibit the reproduction/copying of the multimedia content, the scrambling of the digital data by the access device comprises a suitable protocol to prohibit the reproduction/copying of the multimedia content, and to authorize only the presentation of the multimedia content on a presentation device belonging to the determined secured domain while the digital data is being read by the access device.

7. Secured distribution method according to claim 4, wherein when the reproduction rights authorize the free reproduction/copying of the multimedia content, the scrambling of the digital data by the access device comprises a suitable protocol for authorizing the reproduction/copying and the presentation of the multimedia content on any equipment.

8. Secured distribution method according to claim 1, further comprising transmission of reproduction rights attached to the multimedia content from a remote server to said recorder/receiver, the transmission of reproduction rights being performed prior to the recording of the reproduction rights.

9. Secured distribution method according to claim 8, comprising encryption of the first domain identifier and of the transmitted reproduction rights, said encryption being performed prior to the recording of the first domain identifier and prior to the recording of the reproduction rights.

10. Device for accessing a specific secured domain, the access device comprising:
   means for reading digital data representative of a multimedia content recorded on a secured disk, wherein the disk is secured by a data protection system for recordable media, the reading means being suitable for reading on the secured disk a first domain identifier of a determined secured domain;
   means for storing a second domain identifier of the specific secured domain to which the access device belongs, wherein the second domain identifier is defined by a data protection system in a domain;
   means for comparing the second domain identifier stored in the storage means with the first domain identifier read on the secured disk and decrypting the first domain identifier using the disk key; and
   means for provisioning digital data so as to authorize a first mode of operation of the digital data, when the first domain identifier read on the secured disk does not correspond to the second domain identifier stored in the storage means of the access device, and for provisioning the digital data so as to authorize a second mode of operation of the digital data when the first domain identifier read on the secured disk corresponds to the second domain identifier stored in the storage means of the access device;
   wherein the access device also comprises:
   encryption/decryption means for recovering a disk key from the secured disk according to the data protection system for recordable media and decrypting the first domain identifier using the disk key; and
   scrambling/descrambling means able to descramble the digital data recorded on the secured disk using said disk key;
   wherein the first domain identifier is encrypted by said disk key and the recorded digital data is scrambled by title keys, said title keys being encrypted by said disk key.

11. A receiver capable of recording and belonging to a secured domain having several equipment items and defined by a first domain identifier according to a data protection system in a domain, said first domain identifier being specific to all the equipment of said determined secured domain, the recorder/receiver cooperating with a disk secured by a data protection system for recordable media and the receiver comprising a processor, wherein
   the processor being configured to perform the following steps:
   recording on the secured disk digital data representative of a multimedia content,
   recording on the secured disk the first domain identifier of the receiver defining said determined secured domain as the only domain in which the reproduction/copying of the multimedia content is authorized, and
   storing a second domain identifier of the specific secured domain to which the access device belongs, wherein the second domain identifier is defined by a data protection system in a domain;
   provisioning digital data so as to authorize a first mode of operation of the digital data, when the first domain identifier read on the secured disk does not correspond to the second domain identifier stored in the access device, and for provisioning the digital data so as to authorize a second mode of operation of the digital data when the first domain identifier read on the secured disk corresponds to the second domain identifier stored in the access device;
   recovering a disk key from the secured disk according to a data protection system for recordable media, and
   scrambling the digital data by title keys, the title keys being encrypted by said disk key for encrypting the first domain identifier using the disk key, and for recording said scrambled digital data and said encrypted first domain identifier.

12. Receiver according to claim 11, wherein the processor is further configured to perform the further steps of recording reproduction rights attached to a multimedia content, the reproduction rights defining whether the multimedia content is freely reproducible/copyable or whether the multimedia content is reproducible/copyable in a determined secured domain only, or whether the multimedia content is not reproducible/copyable.

13. Receiver according to claim 12, wherein the reproduction rights attached to a multimedia content comprise the number of reproductions allowed of the multimedia content.

\* \* \* \* \*